(12) United States Patent
Bodie et al.

(10) Patent No.: US 8,029,605 B2
(45) Date of Patent: Oct. 4, 2011

(54) SEPARATOR ASSEMBLY

(75) Inventors: Cameron Bodie, Moose Jaw (CA);
Donald Grant Vass, Regina (CA);
Jonathan Robert Carteri, Regina (CA)

(73) Assignee: Brandt Industries Ltd., Regina, Saskatchewan (CA)

( * ) Notice: Subject to any disclaimer, the term of this patent is extended or adjusted under 35 U.S.C. 154(b) by 232 days.

(21) Appl. No.: 12/392,639

(22) Filed: Feb. 25, 2009

(65) Prior Publication Data
US 2010/0212499 A1      Aug. 26, 2010

(51) Int. Cl.
*B01D 45/00*      (2006.01)
(52) U.S. Cl. ............... 95/267; 55/396; 55/414; 55/439; 55/457
(58) Field of Classification Search .............. 55/396, 55/413, 414, 437, 439, 457; 95/267
See application file for complete search history.

(56) References Cited

U.S. PATENT DOCUMENTS
4,311,494 A * 1/1982 Conner et al. ............ 55/394

FOREIGN PATENT DOCUMENTS
| CA | 2230741 | 3/1998 |
| CA | 2 307 055 | 10/2001 |
| CA | 2 243 798 | 3/2004 |

* cited by examiner

*Primary Examiner* — Robert A Hopkins
(74) *Attorney, Agent, or Firm* — Woodard Emhardt Moriarty McNett & Henry LLP

(57) ABSTRACT

An apparatus for effecting separation of particles from a mixture of particles and gas, the apparatus comprises: a housing that defines therethrough a channel; an inlet in said housing to admit the mixture of particles and gas into the channel; a deflector in the channel; and a gas outlet port substantially parallel to a longitudinal axis of the channel and downstream of the deflector; wherein the deflector is shaped to direct the particles past the gas outlet port. A method of separation is also disclosed.

19 Claims, 6 Drawing Sheets

SEPARATOR ASSEMBLY

FIELD OF THE INVENTION

This application relates to particle handling and, in particular, to an apparatus for separating particles, such as cereal grains, oil seeds and pulse crops, from a mixture of particles and gas.

BACKGROUND OF THE INVENTION

When commodities such as cereal grains, oil seeds and pulse crops are harvested, they are often stored in large storage bins, such as silos, to await transportation to market. Typically, the transportation is by truck. In order to transfer the particles or grains of the commodity from a silo, in which it is stored, into a truck, which will transport the grain to market, a grain vacuum may be used.

An inlet end of the grain vacuum has a hose that is inserted into the silo. An outlet end of the grain vacuum is connected to a grain transport system, such as an auger. The vacuum is turned on to generate a vacuum to pull the grain from the silo into the hose. The operation of the vacuum causes both grain and air to be pulled into the hose and into the grain vacuum. It is desirable to send only the grain and not the air to the grain transport means. To do this, a separation of the air from the grain within the grain vacuum is required.

One means of effecting the separation of the grain and air is to use a separator assembly with an inner surface shape that draws the air off in a direction perpendicular to the direction of flow of the mixture of grain and air. Such a separator, however, has significant manufacturing cost.

SUMMARY OF THE INVENTION

An aspect of the invention relates to an apparatus for effecting separation of particles from a mixture of particles and gas, the apparatus comprising: a housing that defines therethrough a channel; an inlet in said housing to admit the mixture of particles and gas into the channel; a deflector in the channel; and a gas outlet port in the channel and downstream of the deflector; wherein the gas outlet port is open in an upstream direction and the deflector is shaped to direct the particles downstream in the channel past the gas outlet port.

In some embodiments the apparatus further comprises a guide in the channel downstream of the deflector and the guide is shaped to direct the gas to the gas outlet port.

In some embodiments the deflector is shaped to deflect the particles outwardly.

In some embodiments the deflector gradually increases in diameter in the downstream direction.

In some embodiments a longitudinal axis of the deflector extends substantially parallel to the longitudinal axis of the channel.

In some embodiments the guide gradually decreases in diameter in the downstream direction.

In some embodiments the deflector is suspended in the channel.

In some embodiments the sides of the deflector are conical and define an angle of approximately 12° to 30° from the longitudinal axis of the channel.

In some embodiments a longitudinal axis of the deflector and the gas outlet port are substantially coaxial with the longitudinal axis of the channel.

In some embodiments the gas outlet port comprises a tube projecting into the chamber.

In some embodiments the gas outlet port is spaced about 5 to 7 inches from a downstream end of the deflector.

In some embodiments the particles are cereal grain, oil seed or pulse crop particles.

In some embodiments the apparatus further comprising a vacuum generator for drawing the combination of particles and gas into the channel and for drawing the gas out through the gas outlet port.

Another aspect of the invention relates to a method for separating particles from a mixture of particles and gas comprising: drawing the mixture into a channel in a downstream direction; directing the flow of the particles downstream past a gas outlet in the channel, the gas outlet being open in an upstream direction; drawing the gas out through the gas outlet.

In some embodiments the gas outlet is centrally located in the channel and directing the flow of particles comprises directing the flow of particles radially outwards.

In some embodiments drawing the gas through the gas outlet comprises guiding the gas radially inwardly towards the gas outlet.

A further aspect of the invention relates to a separator for use in the separation of particles from a mixture of particles and gas, the separator comprising: a deflector at a first end shaped to deflect the particles radially outwardly; and a guide at a second end shaped to guide the gas inwardly.

In some embodiments the deflector increases in diameter in a direction from the first end to the second end.

In some embodiments the guide decreases in diameter in a direction from the first end to the second end.

In some embodiments the deflector and guide comprise a single component.

A further aspect of the invention relates to a grain vacuum comprising a vacuum generator and the separator assembly described above.

BRIEF DESCRIPTION OF THE DRAWINGS

Embodiments of the invention will now be described with reference to the attached drawings in which.

DETAILED DESCRIPTION OF THE PREFERRED EMBODIMENTS

This invention relates to an assembly for separating particles, such as particles of grain, from a combination of particles and gas. The gas may be air. The assembly can form part of a grain vacuum for transporting grain from a storage bin, such as a silo, to a transportation container, such as the back of a truck.

The apparatus includes a channel into which the combination of particles and gas will be drawn from an inlet. A deflector is located in the channel. The apparatus includes a gas outlet port in the channel downstream from the deflector. The gas outlet port is open in an upstream direction. The deflector is shaped to direct the particles downstream past the gas outlet port. There may also be a guide located in the channel downstream of the deflector and upstream of the gas outlet port. If present, the guide is shaped to help to direct the gas to the gas outlet port.

Figure 1:
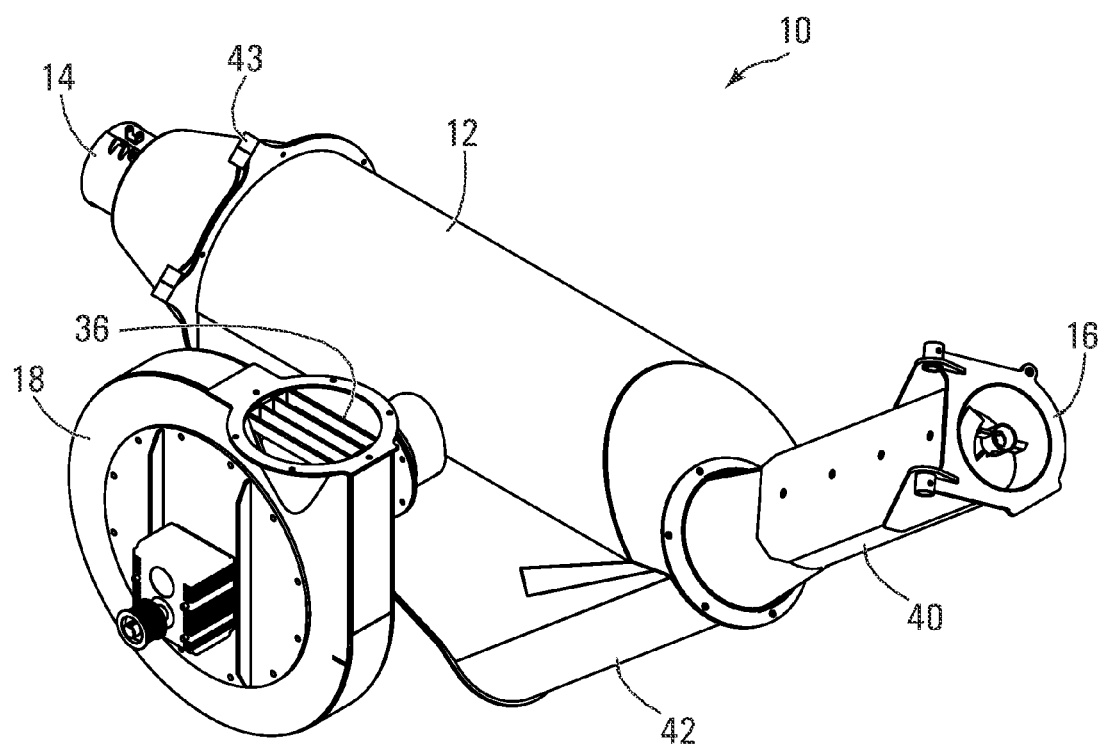
FIG. 1 is an isometric view of a grain vacuum according to an embodiment of the invention.

Turning to the figures in detail, FIG. 1 shows an isometric view of an exemplary grain vacuum 10. The grain vacuum 10, of this example, has a body 12, an inlet 14 at one end of the body and an outlet 16 at an opposite end. The grain vacuum 10 also includes a fan assembly 18 for generating a vacuum.

Figure 2:
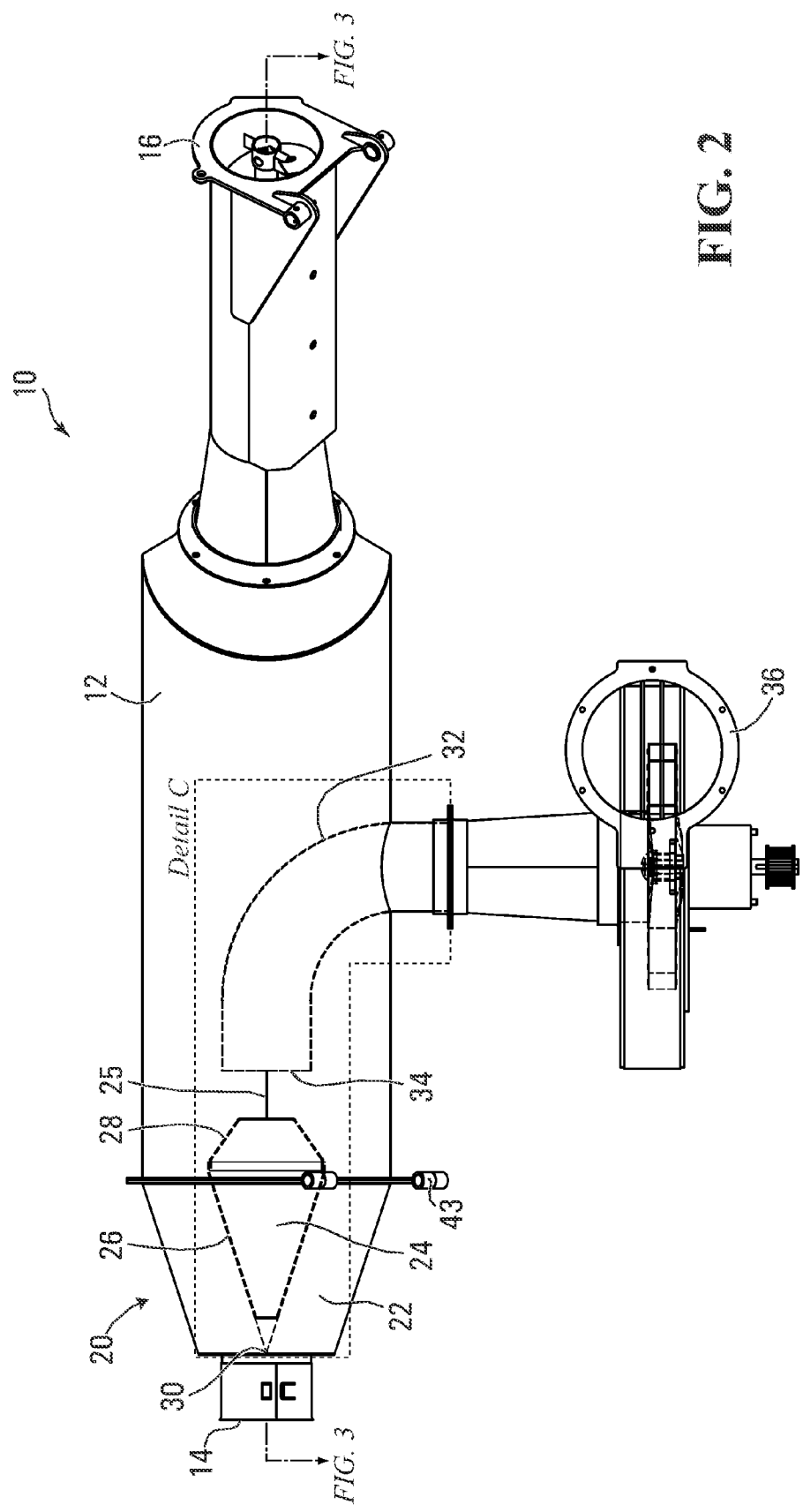
FIG. 2 is a top view of the grain vacuum of FIG. 1.
Figure 3:
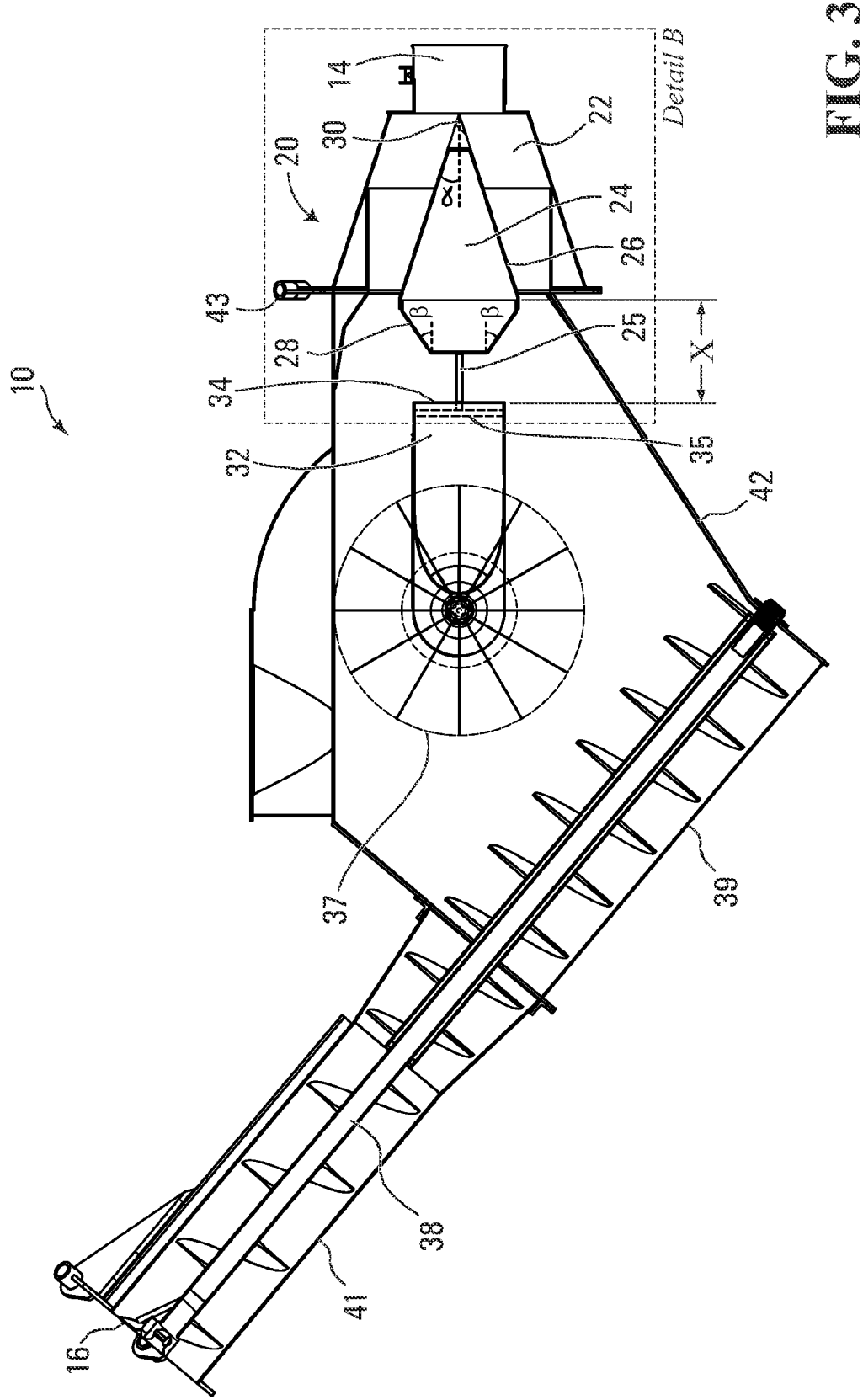
FIG. 3 is a cross-sectional view of the grain vacuum of FIG. 2 taken along line AA.
Figure 4:
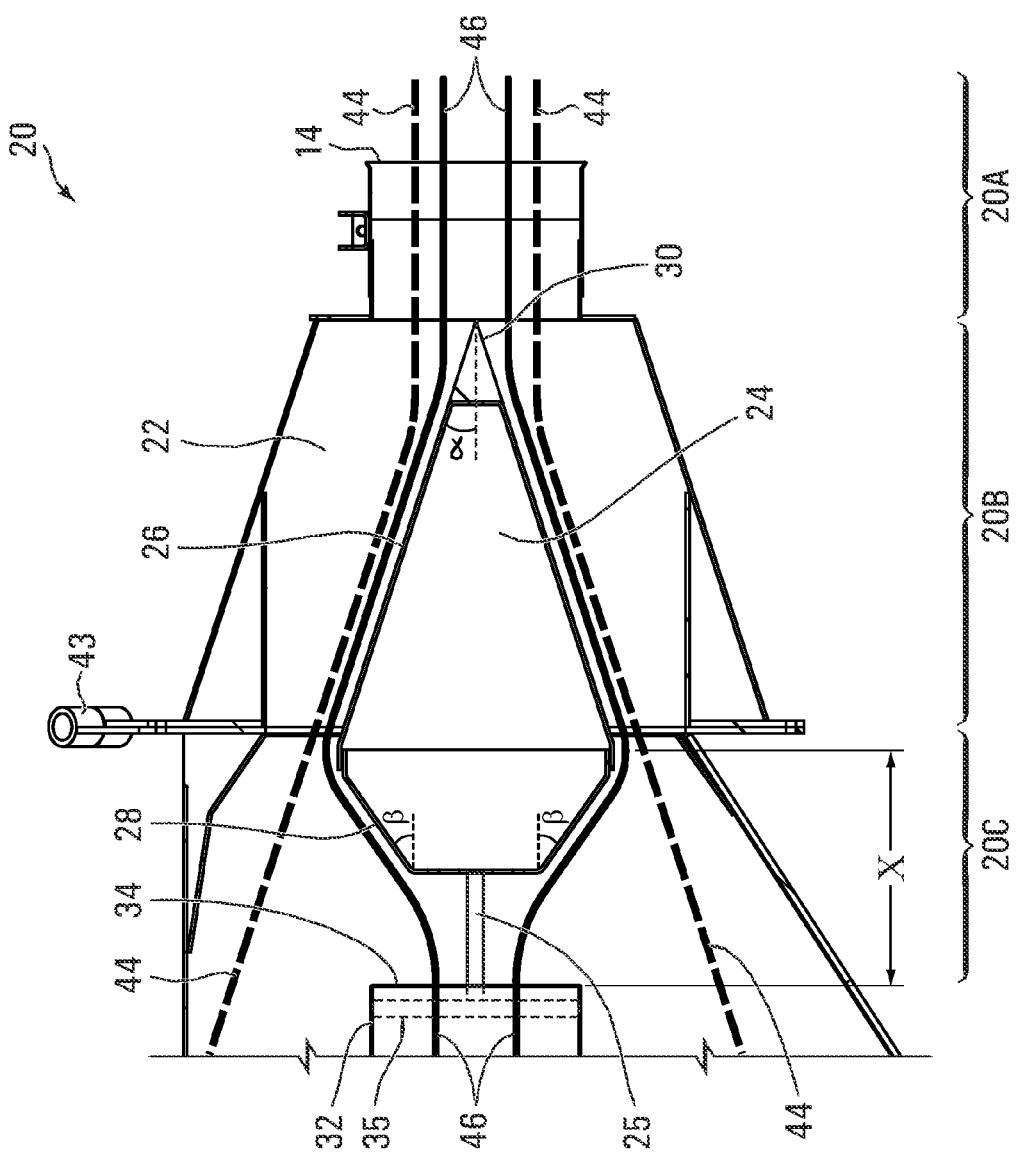
FIG. 4 is an enlarged view of detail B from FIG. 3.

The grain vacuum 10 of this embodiment includes a separator assembly 20, as shown in FIGS. 2 to 4. The separator assembly 20 is positioned in this embodiment adjacent the inlet end 14 of the grain vacuum 10. In other embodiments, the separator assembly may be further downstream. The body 12 of the grain vacuum 10 is a housing which defines a channel 22. In other embodiments, the channel 22 may be formed by a separate element inside the body 12.

In this embodiment, a separator 24 consists of a deflector portion 26 and a guide portion 28. The diameter of the deflector portion 26 in this example gradually increases from the inlet end direction towards the outlet end direction along its longitudinal axis. The diameter of the guide portion 28 gradually decreases from the inlet end direction towards the outlet end or downstream direction along its longitudinal axis. In this embodiment the separator is symmetrical about its longitudinal axis. The deflector portion 26 is conical and the guide portion 28 has a truncated conical shape. The conical shapes that define the deflector portion 26 and the guide portion 28 are oriented in opposite directions and smoothly flow from one to the other.

In this embodiment the angle $\alpha$ of the deflector 26 to its longitudinal axis may be about 12° to 30° and may be 18° and the angle $\beta$ of the guide portion 28 to its longitudinal axis may be about 34°. The relative angles and the shapes of the deflector portion 26 and the guide portion 28 may be varied as long as they function as a separator. For example, the sides of the deflector portion 26 may have a concave or a convex rather than a straight shape and the guide portion 28 may be semi-spherical.

Additionally, the separator 24 need not be completely symmetrical around its longitudinal axis. For example, the angle from the longitudinal axis on the top portion may be different from the angle of the bottom portion to compensate for the effects of gravity. Also, the deflector portion 26 and the guide portion 28 may be separate components, rather than forming a single component may be spaced apart. The guide portion 28 may also be eliminated such that the separator 24 comprises only the deflector portion 26.

The separator 24 is located in the channel 22. In this embodiment, the inlet end 30 of the separator 24 is aligned with the inlet to the channel 22. Again, this positioning may be varied. The inlet end 30 of the separator 24 may extend out of the channel 22 or may be set back further into the channel 22. Although the figures depict the tip of the cone of the deflector portion 26 separately, this in merely a manufacturing option and not essential to the invention. The leading or inlet end 30 of the separator may also be other shapes including rounded or flattened.

As can be seen from FIGS. 3 and 4, the sides of the channel 22 need not track the shape of the separator 24. The shape of the channel need only allow the particles and gas to flow as directed by the deflector 26 and the guide 28.

Figure 6:
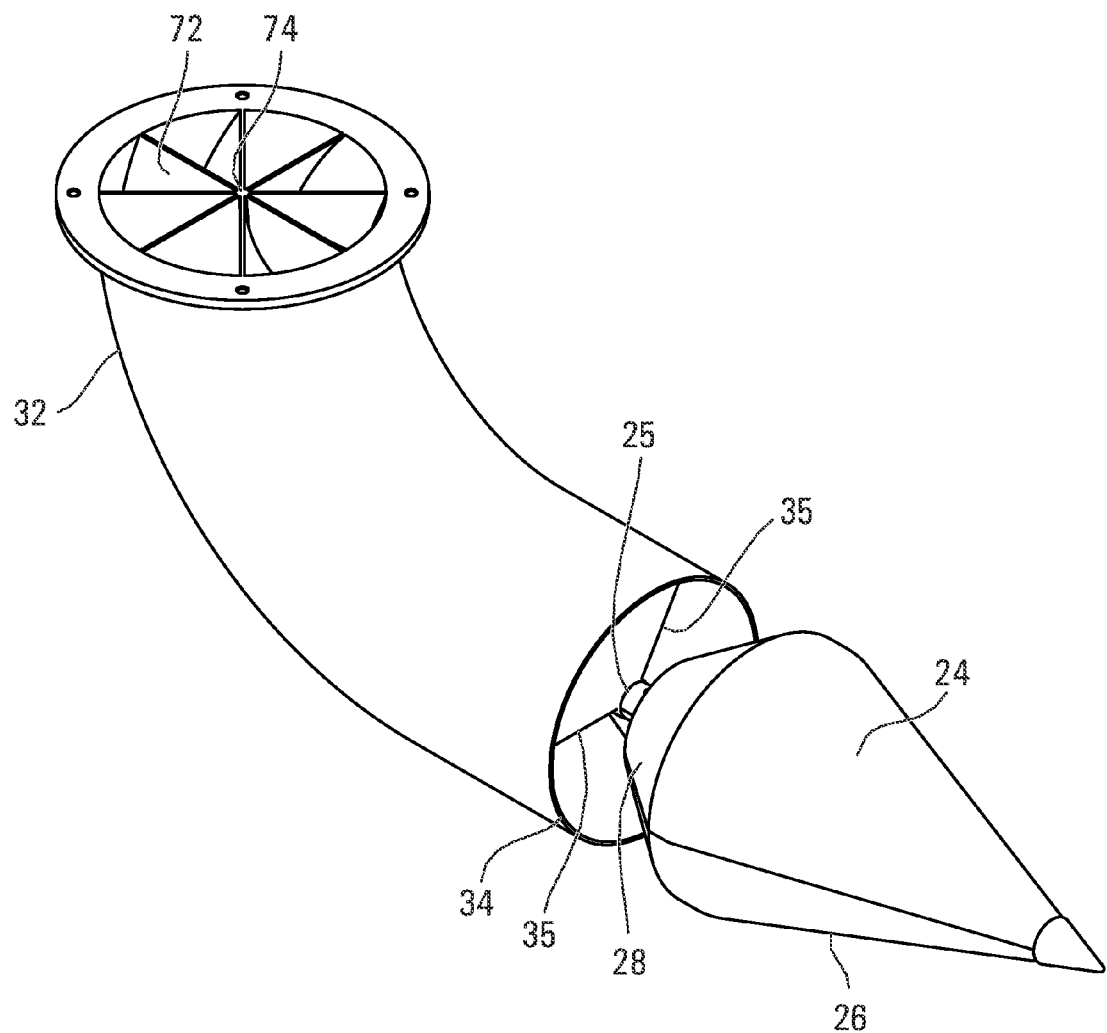
FIG. 6 is a perspective view of detail C from FIG. 2.

The fan assembly 18 is provided to generate the vacuum to pull grain and air into the grain vacuum. As best seen in FIGS. 2 and 6, a conduit 32 which may, for example, be a pipe, connects from the fan assembly 18 which is external to the body 12 to the interior of body 12 and into the channel 22. In this embodiment, the conduit 32 has a rounded elbow section so that the orientation of the portion of the conduit 32 which is external to the body 12 is at right angles to the portion of the conduit 32 which is internal to the body 12.

An inlet end 34 of the conduit 32 of this example is located adjacent to the end of the guide portion 28 of the separator 24. In this embodiment, the inlet end 34 is straight and the diameter of the inlet end is smaller than the maximum diameter of the separator 24. In this embodiment, the separator 24 has a length of 20 inches and a maximum diameter of 10.5 inches and the inlet end 34 of the conduit has a diameter of 8 to 10 inches. However, the size of the conduit may be larger or smaller than the maximum diameter of the separator 24 and configuration of the conduit 32 between the inlet end 34 and the vacuum generator may vary. The inlet end 34 of the conduit 32 may, for example, be flared rather than straight.

In this embodiment, the separator 24 is suspended by a shaft 25 which extents out from the conduit 32. The shaft 25 may be bolted to the separator 24. The separator 24 and the opening of the conduit 32 in this example are centred in the channel 22 along a longitudinal axis of the channel. However, the separator 24 may be otherwise positioned in the channel, for example, it may be slightly offset from centre as long as the position of the separator 24 effects the separation as described further below.

The shaft 25, by which the separator 24 is suspended, is connected to the conduit 32. In this embodiment, three spokes 35 are equally distributed around the conduit and the shaft 25 is suspended from the point of intersection of the spokes along the central axis of the conduit 32 as best seen in FIG. 6.

The opening of inlet end 34 of the conduit 32 is substantially co-axial with longitudinal axis of the channel 22 and the longitudinal axis of the separator 24 in this embodiment. These various components need not be co-axial. However, the efficiency of the separator may be higher if the inlet end 34 of the conduit 32 is substantially parallel to and co-axial with the longitudinal axis of the channel and the separator 24 and the conduit 32 are no more than ¼ to ½ inch off axis from each other.

In this embodiment, the inlet end 34 is spaced from the downstream end of the deflector 26 by a dimension X which is approximately 5 to 7 inches.

The fan assembly 18 also includes an air outlet 36 through which air that travels through the conduit 32 may exit the grain vacuum 10. A conventional fan 37 may be utilized for this purpose.

An auger 38 or other grain transport means may be provided in the channel downstream of the inlet end 34 of the conduit 32. As best seen in FIG. 3, in this embodiment, the auger 38 is positioned at an upward angle along an upwardly angled outlet end 39 of the body 12 then through an auger housing 41 to the outlet end 16 of the grain vacuum 10. In this embodiment, the auger 38 is positioned entirely downstream of the separator assembly 20. The auger may include an air lock or other means at the outlet end 16 to prevent air from coming in from the outlet end 16.

A bottom side 42 of the body 12 of the grain vacuum 10 in this example is downwardly angled such that any grain that falls against the bottom side 42 will be directed to the auger 38 as explained in further detail below. In other embodiments, the bottom may, for example, be flat and the auger positioned horizontally.

In this embodiment, the body portion of the separator assembly 20 is provided with a hinge 43 to allow the separator assembly 20 to be opened by rotating the upstream end of the separator assembly 20 about the hinge 43. This allows easy access to the interior of the body 12 to, for example, replace the separator 24 with a differently sized or shaped separator 24 for use in different operating conditions or grain types.

The flow of the gas and particles through the separator assembly 20 is illustrated in FIG. 4. The separator assembly 20 is divided here into an inlet section 20a, a deflector section 20b, and a guide section 20c. In the inlet section 20a, a combination of air 46 and grain 44 are drawn into the inlet 14 of the grain vacuum 10 by operation of the fan assembly 18. This mixture is drawn axially in a downstream direction along the channel 22 until this mixture contacts the separator 24. In section 20b, the vacuum continues to pull the air and grain in a downstream direction of the channel 22 but because the separator 24 is in the way, the air and grain will accelerate up the sides of the separator 24 along the deflector 26.

When the air and grain reaches the end of the deflector 26 and moves into section 20c, the momentum of the heavier grain particles will cause them to continue along outwardly in the direction defined by the deflector 26 past the inlet end 34. The air being lighter will be pulled by the fan suction on a path defined by the shape of the separator 24. The air will therefore follow the inwardly shaped guide portion 28, if present, and proceed out through the conduit 32 and out through the air outlet 36. Even if the guide portion 28 is not present, the fan suction will draw the air out through the conduit 32. The inlet end 34 is therefore the outlet port of the air from the channel 22. The grain, once it passes the inlet end 34 of the conduit 32 will lose its momentum and fall to the bottom of the body 12 where it will land either on the bottom side 42 and slide into the auger 38 or land directly on the auger 38. The auger 38 once powered will rotate to move the grain outwardly through the outlet 16.

Figure 5:
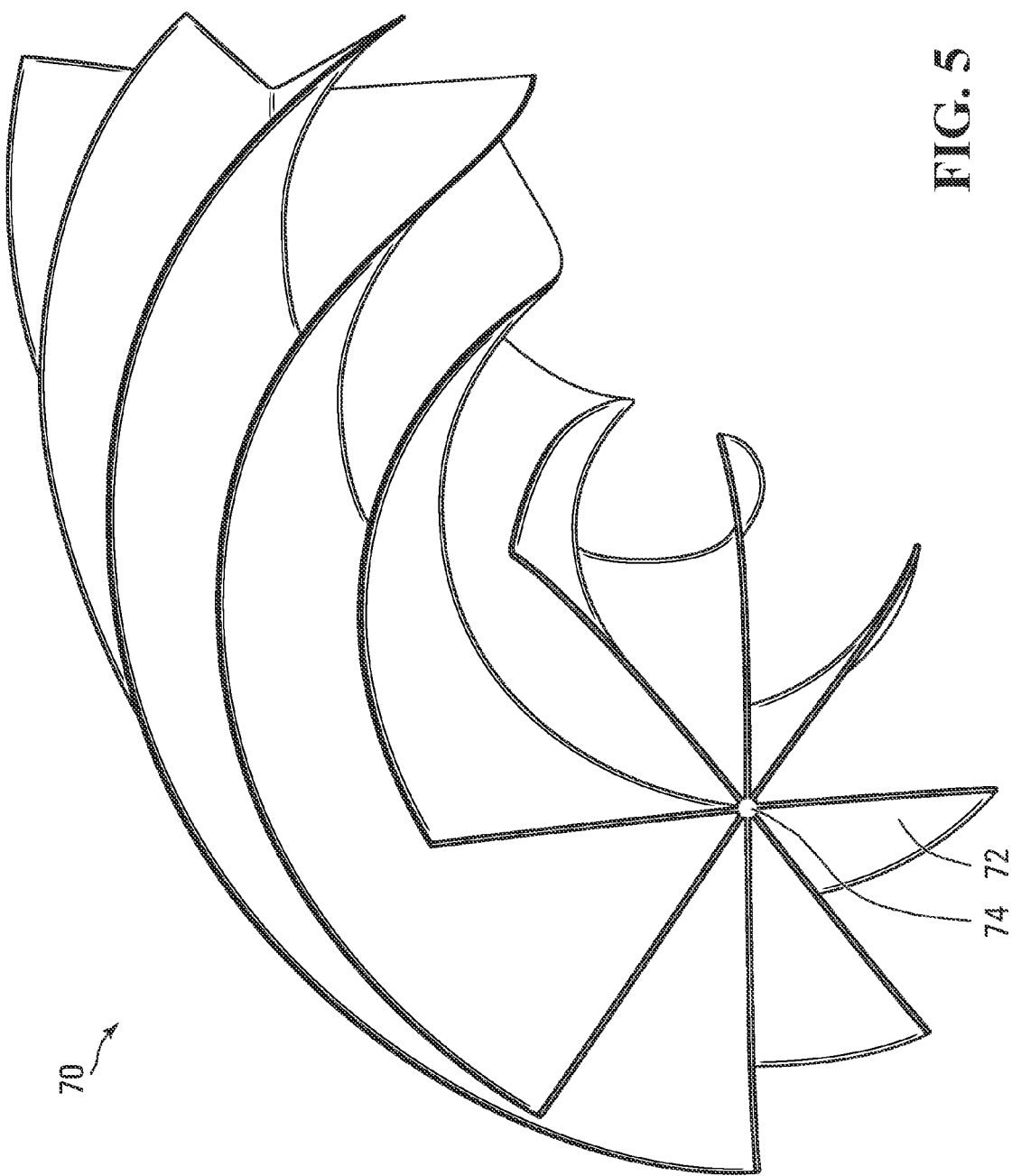
FIG. 5 is a perspective view of a structure for use with the embodiment of FIG. 1.

In some embodiments, internal to the conduit 32, there may be spiralling channels defined to minimize dead air spots. This may be achieved, for example, by including a structure 70, such as shown in FIGS. 5 and 6, internal to the conduit 32. The structure 70 has a number of webs 72, eight are shown in this embodiment, which are connected along the axis 74 of the conduit 32 and extend to the wall of the conduit 32. These webs spiral such that eight spiralling channels are defined within the conduit 32.

It will be appreciated other means of handling the grain once separated from the air may be used.

Similarly, other means of generating a vacuum may be used and the separator may be used with the other machinery.

The separator assembly may be used to separate other granular particles and gases of differing mass.

Numerous modifications and variations of the present invention are possible in light of the above teachings. It is therefore to be understood that within the scope of the appended claims, the invention may be practiced otherwise than as specifically described herein.

We claim:

1. An apparatus for effecting separation of particles from a mixture of particles and gas, the apparatus comprising:
   a housing that defines therethrough a channel;
   an inlet in said housing to admit the mixture of particles and gas into the channel;
   a deflector in the channel;
   and a gas outlet port in the channel and downstream of the deflector;
   wherein the gas outlet port is open in an upstream direction and the deflector is shaped to direct the particles downstream in the channel past the gas outlet port; and
   wherein the deflector is suspended in the channel without substantially obstructing the channel around the deflector.

2. The apparatus of claim 1 further comprising a guide in the channel downstream of the deflector and wherein the guide is shaped to direct the gas to the gas outlet port.

3. The apparatus of claim 1 wherein the deflector is shaped to deflect the particles outwardly.

4. The apparatus of claim 1 wherein the deflector gradually increases in diameter in the downstream direction.

5. The apparatus of claim 4 wherein a longitudinal axis of the deflector extends substantially parallel to the longitudinal axis of the channel.

6. The apparatus of claim 2 wherein the guide gradually decreases in diameter in the downstream direction.

7. The apparatus of claim 2 wherein the deflector and the guide comprise a single component.

8. The apparatus of claim 5 wherein sides of the deflector are conical and define an angle of approximately 12° to 30° from the longitudinal axis of the channel.

9. The apparatus of claim 1 wherein a longitudinal axis of the deflector and the gas outlet port are substantially coaxial with the longitudinal axis of the channel.

10. The apparatus of claim 1 wherein the gas outlet port comprises a tube projecting into the chamber.

11. The apparatus of claim 1 wherein the gas outlet port is spaced about 5 to 7 inches from a downstream end of the deflector.

12. The apparatus of claim 1 wherein the particles are cereal grain, oil seed or pulse crop particles.

13. The apparatus of claim 1 further comprising a vacuum generator for drawing the combination of particles and gas into the channel and for drawing the gas out through the gas outlet port.

14. A grain vacuum comprising a vacuum generator and the separator assembly of claim 1.

15. The apparatus of claim 1 wherein the deflector is suspended in the channel from the downstream end of the deflector.

16. The apparatus of claim 15 wherein the deflector is suspended in the channel by a member that extends out from the gas outlet port.

17. A method for separating particles from a mixture of particles and gas comprising:
   drawing the mixture into a channel in a downstream direction;
   directing the flow of the particles along a deflector downstream past a gas outlet in the channel, the gas outlet being open in an upstream direction;
   drawing the gas out through the gas outlet;
   wherein the deflector is suspended in the channel without substantially obstructing the channel around the deflector.

18. The method of claim 17 wherein the gas outlet is centrally located in the channel and directing the flow of particles comprises directing the flow of particles radially outwards.

19. The method of claim 17 wherein drawing the gas through the gas outlet comprises guiding the gas radially inwardly towards the gas outlet.

* * * * *